United States Patent [19]

Horr

[11] Patent Number: 5,326,304
[45] Date of Patent: Jul. 5, 1994

[54] EXTRACTOR FOR RECOVERING ROYAL JELLY FROM ARTIFICIAL HONEYCOMB LATHES

[76] Inventor: Bohumir Z. Horr, 306 W. 93rd St., New York, N.Y. 10025

[21] Appl. No.: 68,774

[22] Filed: Jun. 1, 1993

[51] Int. Cl.⁵ .......................................... A01K 59/00
[52] U.S. Cl. .................................................... 449/50
[58] Field of Search ................. 449/50, 53, 54, 56, 449/63

[56] References Cited

U.S. PATENT DOCUMENTS

| | | | |
|---|---|---|---|
| 3,840,925 | 10/1974 | Croan | 449/53 X |
| 4,776,051 | 10/1988 | Syme | 449/53 |

FOREIGN PATENT DOCUMENTS

| | | | |
|---|---|---|---|
| 1009029 | 3/1952 | France | 449/53 |
| 2561868 | 10/1985 | France | 449/53 |
| 1187769 | 10/1985 | U.S.S.R. | 449/50 |

*Primary Examiner*—Robert P. Swiatek
*Attorney, Agent, or Firm*—Myron Amer

[57] ABSTRACT

A rotationally-driven piston used as an extractor for recovering bee's royal jelly in the use of which a mixture of lavre and royal jelly is expelled by centrifugal force against a lavre-removal screen which results in only the royal jelly continuing therethrough to a surrounding piston chamber wall, from which the royal jelly is then scraped during manual movement of a piston head axially of the piston chamber.

2 Claims, 2 Drawing Sheets

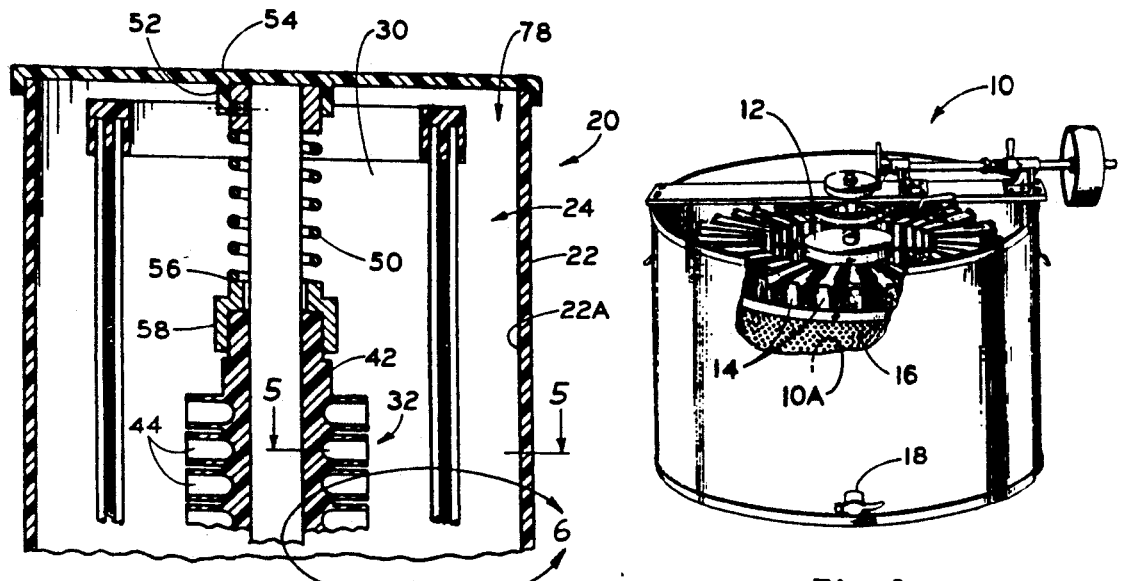
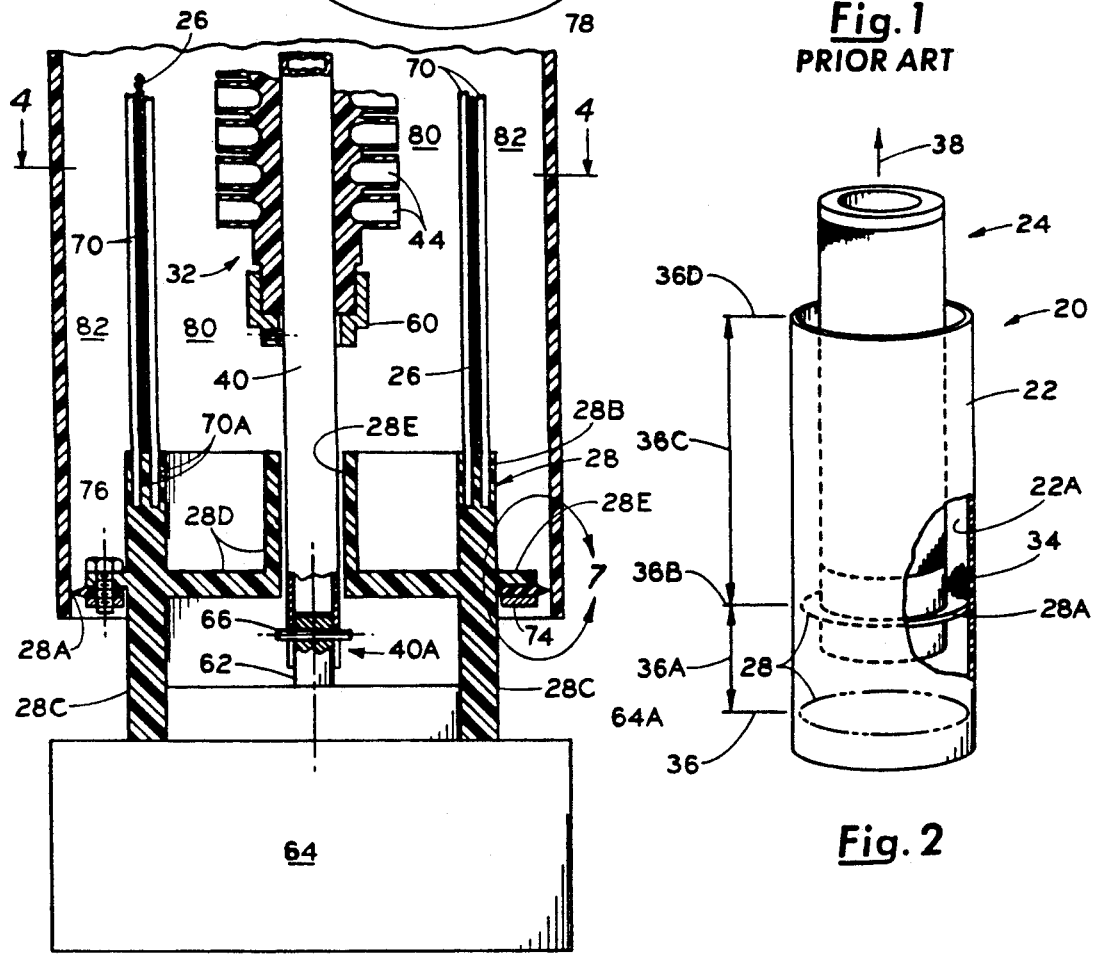
Fig. 1 PRIOR ART
Fig. 2
Fig. 3

EXTRACTOR FOR RECOVERING ROYAL JELLY FROM ARTIFICIAL HONEYCOMB LATHES

This invention relates to the collection and recovery of honey, and more particularly to queen's royal jelly, using artificial honeycombs and the use of centrifugal force. It is already well known that plural lathes with a lengthwise arrangement of cups thereon which comprise the artificial honeycomb can be removed from a bee hive super, placed in a centrifuge, and using centrifugal force have the honey contents of the cups expelled therefrom. In accordance with the specific objects of the present invention, the cups are more particularly queen's cups, and the recovery is of royal jelly from the fluid royal jelly and particulate lavre contents of the queen's cups.

EXAMPLES OF THE PRIOR ART

The methodology of achieving filled queen's cups of a mixture of fluid royal jelly and particulate lavre on removable lathes preparatory to the harvesting of the royal jelly component of the mixture is, as already noted, well known in the patent literature, as exemplified by U.S. Pat. No. 3,840,925 issued on Oct. 15, 1974 to Kenneth F. Croan for "Method of Recovering Honey from Artificial Honeycombs" and U.S. Pat. No. 1,791,605 issued on Feb. 10, 1931 to H. H. Root entitled "Radial Extractor and Method of Extracting Honey".

The operating mode of the aforesaid, and all other similar devices using centrifugal force, has significant shortcomings when applied to the collection and recovery of queen's royal jelly, due primarily to the highly viscous nature of this fluid which renders it inappropriate to rely on its gravity flow from the centrifuge, and which heretofore has been an unsatisfactorily solved obstacle.

Broadly, it is an object of the present invention to overcome the foregoing and other shortcomings of the prior art. More particularly, it is an object to centrifuge the queen's royal jelly from the artificial honeycombs and also to readily effect its manual, rather than gravity flow, removal from the extractor to thereby correspondingly significantly increase the harvested amount thereof.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of a centrifuge exemplary of the prior art for recovering honey from artificial honeycombs;

FIG. 2 is a perspective view of the within inventive centrifuge illustrating the operating mode thereof and with portions broken away to better illustrate internal structural features;

FIG. 3 is a front elevational sectional view, on an enlarged scale, of the within inventive centrifuge;

Figure 4:
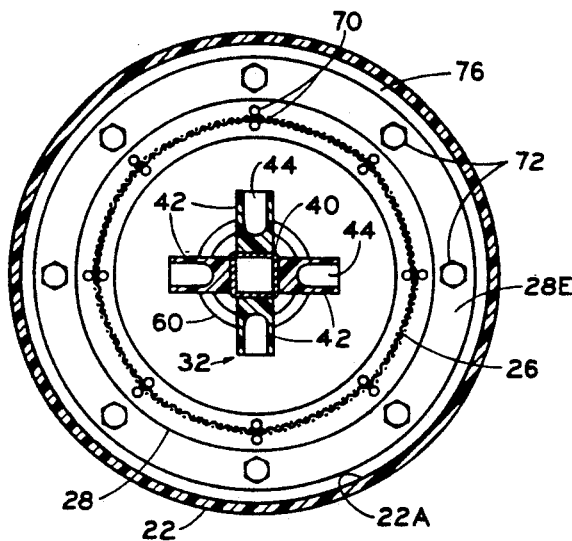
FIG. 4 is a sectional plan view taken along lines 4—4 of FIG. 3.
Figure 5:
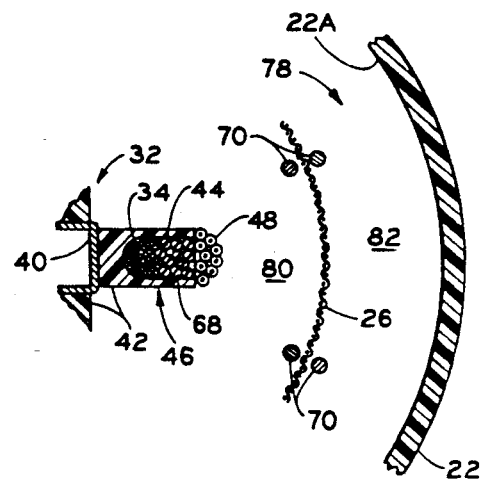
Figure 6:
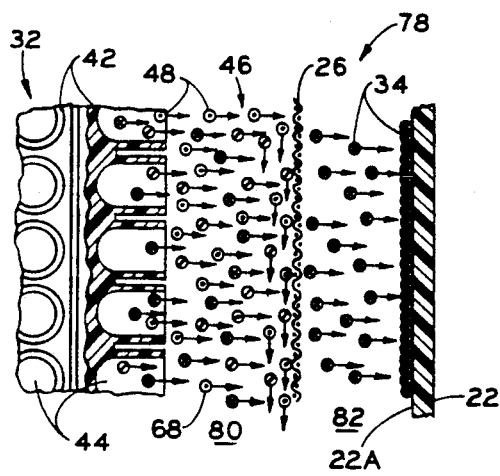
Figure 5A:
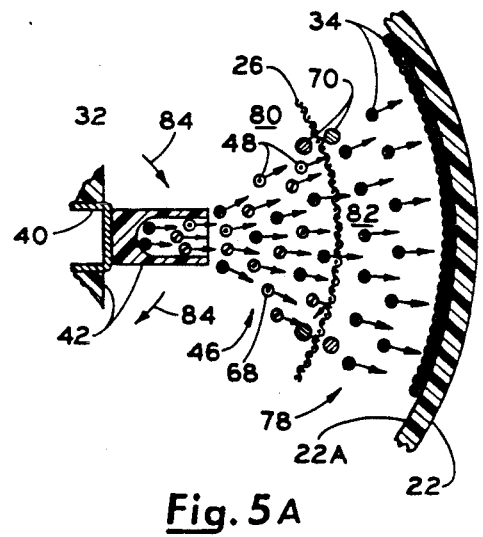
Figure 7:
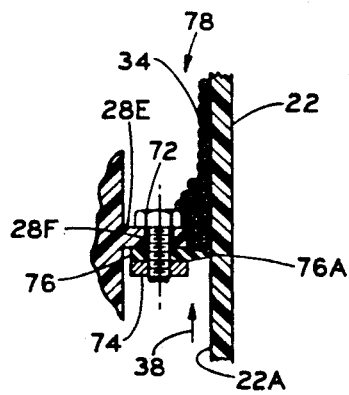

FIGS. 5, 6 and 5A are sectional plan views taken respectively along line 5—5 for FIGS. 5 and 5A and reference line 6 for FIG. 6 of FIG. 3, which illustrate in sequence the steps in the operating mode of the inventive centrifuge; and FIG. 7 is a detailed sectional view of the scraping component denoted by the reference line 7 of FIG. 3.

Reference should be made first to FIG. 1 illustrating the prior art centrifuge 10 of H. H. Root, the main components of which are a motor-driven rotor 12 with circumferentially spaced radially oriented artificial honeycombs, individually and collectively designated 14, constructed with the equivalent of cups or cells (not specifically shown in FIG. 1) filled with honey to be recovered from the honeycombs 14. In accordance with the operating mode of the centrifuge 10, a separating screen 16 is disposed in encircling relation about the rotor 12 so that at the selected rotational speed of the rotor 12 the generated centrifugal force expels the honey through the screen 16 and onto the interior wall 10A of the centrifuge. The honey thusly deposited on the wall 10A is expected to gravity flow to the base of the centrifuge 10 and removed through circumferentially spaced outlets 18.

The prior art operating mode of the H. H. Root centrifuge 10 and all other known similar devices has significant shortcomings when applied to the collection and recovery of queen's royal jelly, due primarily to the highly viscous nature of queen's royal jelly rendering it inappropriate for gravity flow in its removal from the centrifuge, and also its presence in a mixture with particulate lavre, the separation of which from the fluid royal jelly has been very tedious.

In contrast to, and overcoming the noted prior art shortcomings in the collection and recovery of queen's royal jelly, there is herein illustrated and described an improved centrifuge 20, the operational mode of which can be readily understood from FIG. 2. As shown in FIG. 2 the centrifuge 20 includes a non-rotary cylindrical outer housing 22 which functionally is aptly characterized as a piston 22, in which there is slidably disposed a non-rotary operating member which functionally is aptly characterized as a piston rod 24, the individual significant structural component of which is a separating screen 26 which is attached to extend vertically of a piston head 28. As will be best understood as the description proceeds, the circular screen 26 is disposed in encircling relation about lathes with royal jelly and lavre particulate-filled cups disposed within chamber 30 bounded by the screen 26, the lathes and cups 32 (see FIG. 3) being functionally the rotor of the centrifuge 20 and urged through rotation so that only the fluid royal jelly is expelled by centrifugal force through the screen 26 and is deposited on the interior piston surface 22A, as exemplified by the royal jelly mass 34.

More particularly, and still referring to FIG. 2, from an initial starting sliding position of movement denoted 36, piston head 28 is urged through sliding movement along the piston surface 22A in response to corresponding axial movement of the piston rod 24 in the direction 38. Thus, when there is axial movement 36A to the position of movement 36B, the peripheral edge 28A of the piston head 28 will have effectively removed, by scraping, the royal jelly mass 34 from the royal jelly-collection wall 22A of the piston 22. Upon completion of the remaining axial stroke 36C of the piston rod 24 to the top position of movement 36D, all of the royal jelly 34 will be conveniently made accessible about the peripheral edge 28A of the piston head 28 for collection and removal. In practice, the yield of royal jelly 34 collected and recovered according to the operating mode of the within inventive centrifuge 20 is significantly greater than that of prior art centrifuges relying on gravity flow of the honey (or royal jelly) as a method or process step in its collection and, additionally, the collected royal jelly 34 is previously screened of particulate lavre by the centrifugal force-induced pass through the screen 26, thus requiring no further purification from the lavre particulate.

The preferred embodiment or construction of the centrifuge 20 to practice the inventive royal jelly collection and recovery method described in connection with FIG. 2, is shown in remaining FIGS. 3-7, to which reference is now made. As best shown in FIG. 3, the rotor 40 is adapted to have mounted in circumferential relation thereon four lathes, each having plural vertically spaced cups, individually and collectively designated 44. The cups 44 are filled with the royal jelly and lavre particulate mixture 46 (see FIG. 5) which typically is capped by bee's wax 48 and is disposed in outwardly facing relation to the inner royal jelly-collection surface 22A of piston 22. The lathes 42 are held under the urgency of a helical spring 50 seated in a cap 52 of the piston cover 54 and in contact, at 56, with a mounting bracket 58 fitted over the shaped upper ends of the lathes 42, while the lathe lower ends are seated in a screw-attached bracket 60 adjacent the base of the rotor 40.

The very lower end 40A of rotor 40 is hollow so as to receive in projected relation therein an upstanding drive shaft 62 of a motor 64 of the type, which has been found to work effectively in practice, could be a 12 volt motor operated by line current or a car battery at various selected speeds including 1500 RPM such as is used in blenders. The drive connection is detachably achieved using a removable locking pin 66, i.e. when pin 66 is in place as shown, the shaft 62 of the energized motor 64 drives rotor 40, in rotation, and removal of pin 66 permits removal of rotor 40 from its position centrally of the non-rotary separating screen 26.

Disposed in encircling relation about rotor 40 is the circular separating screen 26 of a selected mesh having 3×3 mm openings to prevent the passage therethrough of the mixture 46 particulate lavre 68 (see FIG. 5) but allowing therethrough the fluid royal jelly 34. As shown in FIG. 3 in conjunction with FIGS. 4 and 5, screen 26 is supported in its vertical position between cooperating rods 70, which rods 70 also provide the rigidity to the screen construction to allow it to be urged axially, in the direction 38, of the piston 22, as already noted in the description of the operating mode illustrated in FIG. 2.

Completing the screen construction is the piston head, generally designated 28, which receives in an adhesive or otherwise appropriate attachment, as at 28B, the lower ends 70A of the rods 70, in opposite piston head sides 28C which function as a support stand of the screen construction on a support surface 64A of the motor 64. Molded integrally of the legs 28C is a shaped configuration 28D bounding a central opening 28E through which the rotor 40 is projected for its operative connection to the drive shaft 62.

Completing the construction of piston head 28 is a lateral molded projection 28E, shown in enlarged scale in FIG. 7, having a through bore 28F which receives a bolt 72 and cooperating nut 74 to mount beneath the projection 28E a circular scraping member 76 with a pointed scraping peripheral edge 76A to collect, by scraping, the royal jelly mass 34 previously separated from the lavre particulate 68 and deposited on the piston surface 22A, all as can be readily understood from FIG. 7. Preferably, the construction material of the scraper 76 is plastic or elastomeric. Point 76A will be understood to be in light contact with surface 22A and, most significant, is not prevented by friction or otherwise from being urged in movement 38 relative to surface 22A because the deposited royal jelly 34 although highly viscous is, nevertheless, fluid and as such effectively serves as a lubricant for the axial movement 38.

The operating mode of the within inventive centrifuge 20 is demonstrated in the sequential FIGS. 5, 5A and 6. From the starting setup of FIG. 5, the capped mixture 46 in the queen's cups 44 can be used as illustrated, or the caps 48 partially or totally cut off. The encircling relation of piston 22 relative to rotor 40 bounds a royal jelly-separating chamber 78 which is subdivided by the circular screen 26 into an inner lavre particulate-collecting chamber 80 and an outer royal jelly-collecting chamber 82.

As shown in FIG. 5A, rotation 84 develops in a well understood manner a centrifugal force causing the radial movement of the royal jelly, denoted by the arrows with the circled "X"s, and the particulate lavre, denoted by the arrows and reference numeral 68, into impingement with the screen 26. The openings of the mesh of screen 26 block passage of the particulate lavre but not the fluid royal jelly (FIG. 5A), so that a build-up occurs of the royal jelly 34 on the inner wall 22A of the piston 22 (FIG. 6).

The rotor 40 is removed from the centrifuge 20, and the build-up of royal jelly 34 removed by the scraping action of the piston head scraping member 76 from the piston wall 22A as the piston rod 24 is moved axially in the direction 38 of the piston 22.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A device for separating bee's royal jelly from a mixture of fluid royal jelly and particulate lavre comprising a vertically oriented upstanding supported cylindrical piston selectively detachable from its support having a wall bounding a royal jelly-separating chamber therein, a piston head adapted to be slidably disposed in said royal jelly-separating chamber having an initial starting position of movement at the bottom end thereof, a motor means having an upstanding driving shaft operatively disposed through said piston head, a rotor and cooperating connecting means for detachably interconnecting said rotor to extend from said upstanding driving shaft of said motor means centrally of said royal jelly-separating chamber, plural lathes with queen's cups in outwardly facing relation filled with said mixture of fluid royal jelly and particulate lavre mounted circumferentially about said rotor, and a piston rod consisting of a porous screen of plastic construction material with openings of a selected size to block the passage therethrough of said particulate lavre disposed in supported relation on said piston head and in encircling relation about said rotor delineating said royal jelly-separating chamber into an inner lavre-collection chamber and an outer royal jelly-collecting chamber, whereby the driving in rotation by said motor means of said rotor expels by centrifugal force said mixture from said queen's cups into contact against said screen resulting in the deposit of lavre in said lavre-collecting chamber and the passage therethrough only of fluid royal jelly into said royal jelly-collecting chamber preparatory to the facilitated removal thereof by movement of said piston rod with attached piston head thereon lengthwise of said piston which results in said piston head wiping said royal jelly from said chamber-bounding wall of said cylindrical piston.

2. A method of separating bee's royal jelly from a mixture of fluid royal jelly and particulate lavre using centrifugal force comprising the steps of mounting in vertical orientation a circumferential arrangement of bee hive lathes with plural queen's cups in outwardly facing relation filled with a mixture of fluid royal jelly and particulate lavre, disposing in encircling relation about said vertical arrangement of lathes a royal jelly and particulate lavre separating screen of a selected size mesh to allow the passage therethrough only of said fluid royal jelly, disposing in encircling relation about said separating screen a cylindrical piston having in facing relation to said separating screen a royal jelly-collection surface, supporting said separating screen on a piston head at an initial position of movement at the base of said cylindrical piston, urging in rotation said circumferential arrangement of bee hive lathes with said filled plural queen's cups so as to expel by centrifugal force royal jelly through said separating screen onto said royal jelly-collection surface of said cylindrical piston, and urging said piston head from said initial position of movement axially along the interior of said cylindrical piston to the opposite end thereof, whereby during said axial movement a peripheral edge of said piston head scrapes said royal jelly from said piston royal jelly-collection surface preparatory to the facilitated recovery thereof.

* * * * *